Nov. 24, 1964  E. FRISCH  3,158,766
GRIPPER TYPE LINEAR MOTION DEVICE
Filed April 30, 1962  4 Sheets-Sheet 3

Nov. 24, 1964  E. FRISCH  3,158,766
GRIPPER TYPE LINEAR MOTION DEVICE
Filed April 30, 1962  4 Sheets-Sheet 4

INVENTOR
Erling Frisch
BY
ATTORNEY

United States Patent Office 3,158,766
Patented Nov. 24, 1964

3,158,766
GRIPPER TYPE LINEAR MOTION DEVICE
Erling Frisch, Pittsburgh, Pa., assignor to Westinghouse Electric Corporation, East Pittsburgh, Pa., a corporation of Pennsylvania
Filed Apr. 30, 1962, Ser. No. 191,218
13 Claims. (Cl. 310—14)

The present invention is directed to linear motion devices and more particularly to such devices having gripper arms thereon for rectilinearly moving an element in a step-by-step manner.

Present linear motion devices are particularly adapted to move various elements in a linear direction to any desired position, such as the elements used in controlling a complex chemical process involving frequently a high-temperature environment or for controlling various elements of a complex machine tool. The elements to be positioned may be located within a sealed pressure vessel which require some type of seal where the linear motion device enters the sealed vessel.

Linear motion devices forming the prior art have utilized latching or gripping members which are actuated by suitable actuating means, such as a solenoid coil, to cause engagement or disengagement of the element to be moved. The gripper when in its engaged position is moved a small increment in the direction of desired linear motion at which point the element is engaged by a holding means. The gripper is then decoupled from the element, returned to its initial position, and is again coupled to the element. At that time the holding means for the element is decoupled therefrom and the gripping means in the element are moved an additional increment in the aforementioned direction. With such systems of the prior art it is to be noted that the gripper is decoupled from the element while the element still frictionally engages the gripper. In other words, the decoupling movement of the gripper takes place while the gripper is still under load. Continuous frictional engagement between the gripper and the element during its coupling and decoupling portions of its cycle produces a substantial amount of wear on the grippers. As a result, frequent replacement of the grippers is required thereby limiting the use of such linear motion devices in applications wherein frequent maintenance and repair is impractical.

Subsequent innovations in gripper type linear motion devices have, to some degree, overcome certain of the faults of the continuous frictional engagement linear motion device. Provisions have been made on certain linear motion devices to remove the load placed on the gripper by the element before the gripper is decoupled therefrom. These devices were also formed to include means for disposing the elements relative to the gripper so that frictional engagement of the gripper and the linear element during the coupling portion of its cycle does not occur. It can be appreciated that the aforementioned innovations in gripper type linear motion devices eliminated excessive wear on the gripper with the resulting mechanisms having substantially longer life operations.

In the construction of the aforementioned gripper type linear motion devices having load transfer features wherein the load of the element is removed from a gripper during the coupling and decoupling movement of the gripper, a relatively large sized and relatively expensive linear motion device was produced. More particularly in order to provide a linear motion device which was capable of moving a movable element incrementally in either of two opposed directions, it was necessary to provide each linear motion device with at least two sets of gripper arms for sequential engagement with the linearly movable element. At least five solenoid-type coils were necessary to provide the aforementioned movement. Two of the solenoid coils were required respectively to provide latching movement of the two grippers. A third coil was necessitated for the purpose of providing the load transfer function of the grippers. The fourth and fifth coils of the prior art mechanisms comprised lift and pull down coils respectively for one of the gripper sets.

As can be appreciated, solenoid coils constructed for use with such linear motion devices are extremely expensive to manufacture, especially for use in high temperature applications. Furthermore, the location of five coils to provide the several types of gripper movement of the linear motion device is necessarily more space consuming than an apparatus utilizing fewer coils.

Accordingly, an object of this invention is to provide a novel and efficient linear motion device of the gripper type having a load transfer function with minimized cost and size.

A further object of this invention is to provide a new and improved gripper type linear motion device having solenoid coils with a minimized number of coils required to provide incremental linear motion of a movable element in both of two opposite directions.

Still another object of this invention is to provide a novel gripper structure for a linear motion device.

A further object of this invention is to provide a gripper type linear motion device having the load transfer function thereof achieved without the use of a solenoid coil.

Another object of this invention is to provide a latch type linear motion device which accomplishes rectilinear incremental movement of a movable member without excessive wear and at relatively high speeds.

Briefly, the present invention accomplishes the above cited objects by providing a gripper type linear motion device utilizing merely three solenoid coils to provide incremental linear motion for a linearly movable element. Two of the coils are formed to provide, when energized, latching for the two grippers of the linear motion device. A third coil is provided to achieve lifting or lowering, as the case may be, of the linearly movable element. Both the load transfer function and the pull down function of the linear motion device, which was achieved by the prior art with two solenoid coils, are provided in accordance with this invention by resilient means such as springs which bias the grippers in predetermined directions to accomplish the same function as the solenoid coils of the prior art.

It is to be noted that the sequential energization of five solenoid coils in accordance with the prior art is of necessity, more time consuming than the sequential energization of a three solenoid coil device pursuant to the instant invention. Thus, the speed of movement of the present linear motion device is substantially increased.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1A:
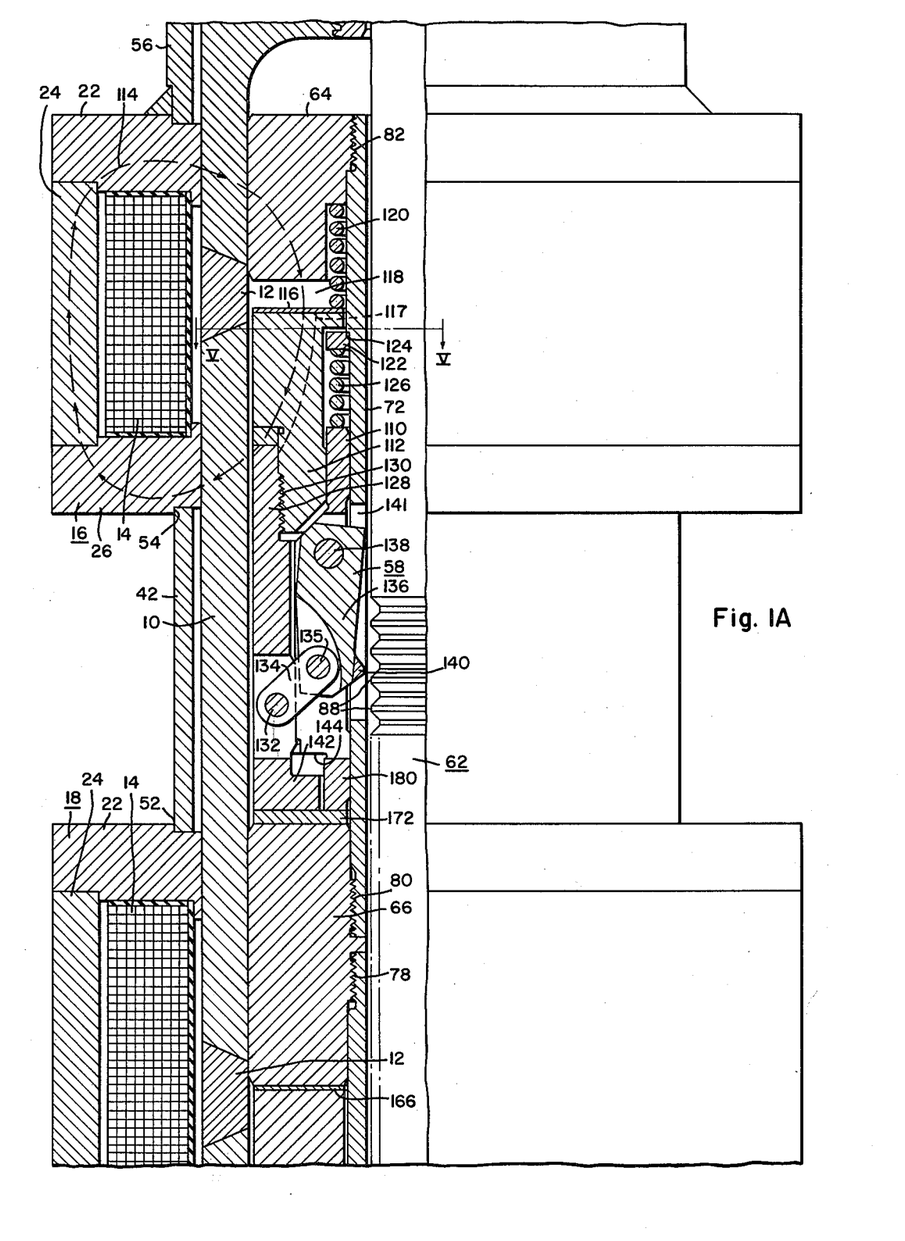
FIGURES 1A and 1B, when taken end-to-end, comprise a composite elevational view, partially in section, of a linear motion device embodying an exemplary arrangement of this invention.
Figure 1B:
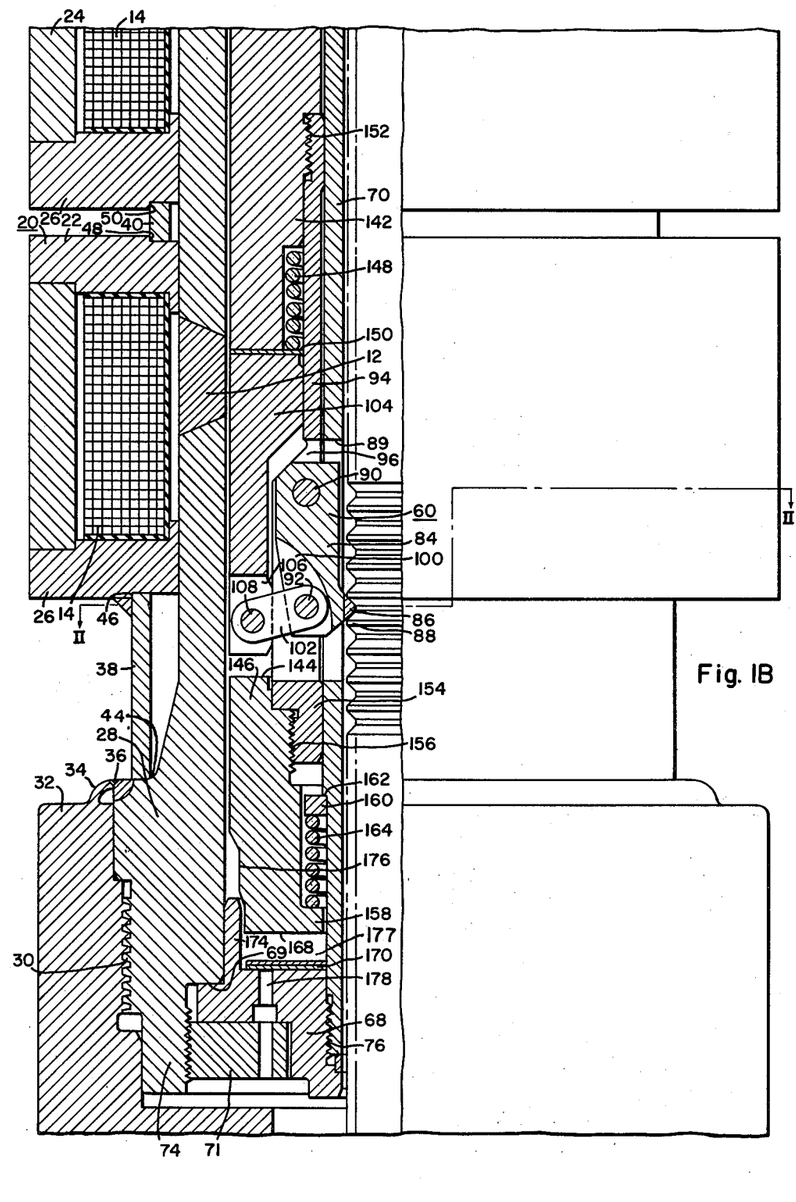

For purposes of describing the instant invention, it will be noted that the gripper members of the linear motion device may be located in three relative positions with respect to the linear element which is moved thereby. One of the aforesaid relative positions will be defined as the "unlatched" position wherein the gripper is not in position for engagement with the teeth or other suitable catch means of the linearly movable element. For example, the upper gripper in FIGS. 1A–1B is located in the unlatched position.

Figure 4:
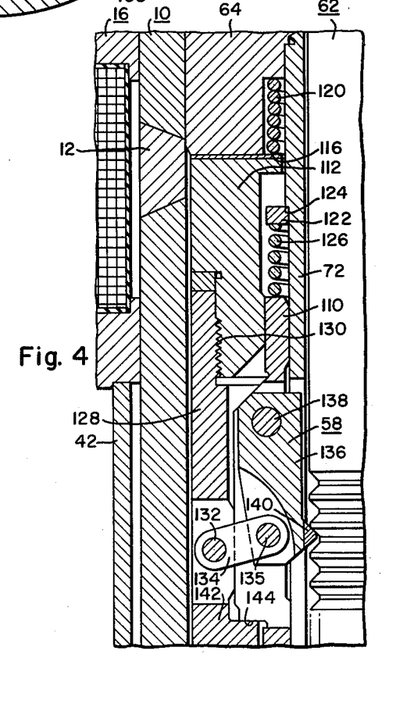
FIG. 4 is a view similar to FIGURE 3 and illustrating the upper gripper in the "latched" position.
Figure 5:
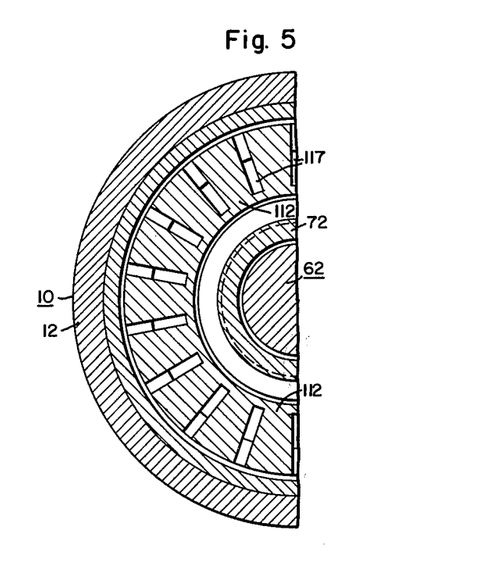
FIG. 5 is a sectional view of the linear motion device illustrated in FIGURES 1A–1B and taken substantially along the line V—V thereof.

A second relative position will be defined as the "latched" position wherein the gripper is engaged with the linearly movable element and wherein the gripper is subjected to the load or weight of the linearly movable element. The latched position of the upper gripper of FIGS. 1A–1B is illustrated in FIGURE 4 of the drawings.

Figure 3:
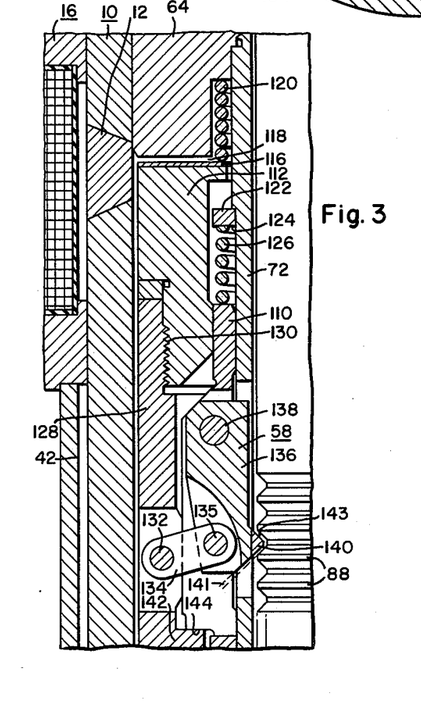
FIG. 3 is a fragmentary view in section of the upper gripper of the linear motion device illustrated in FIGURES 1A–1B and illustrating the gripper in the "coupled" position.

The third relative position of the components is defined as the "coupled" position wherein the gripper is located in its engaged position relative to the linearly movable element but the gripper is not subjected to the load created thereby. In other words, a clearance exists between the teeth of the linearly movable element and the outward tip of the gripper as illustrated in FIGURE 3.

It will therefore be understood that a difference between the latched position and the coupled position of the gripper exists not with respect to the radial position of the gripper inasmuch as the radial position of the gripper would be the same, but by virtue of different axial positions of the linearly movable element and gripper. In the latched position, the linearly movable element is in an axial position, wherein the gripper is subjected to the load thereof. For the coupled position, the linearly movable element is in an axial position wherein the gripper is not subjected to the load thereof.

Referring now with particularity to the apparatus illustrated in FIGURES 1 through 5, a linear motion device constructed in accordance with the principles of this invention is provided with a tubular outer housing 10. In this example, the housing 10 is formed from magnetic material of a thickness capable of withstanding internal pressures on the order of 2000 p.s.i. and formed for certain applications to seal hermetically the interior of the housing 10. The housing 10 can be provided with a plurality of spaced circumferential weld inserts 12 disposed between adjacent axial portions of the housing 10 and formed from non-magnetic material. The function of the weld inserts 12 is to interrupt a shunting magnetic path which would exist along the housing 10 in the axial direction were the housing formed completely from magnetic material. The housing 10 is provided with a plurality of annular solenoid coils 14 mounted in an axially spaced array on the outer surface thereof in positions juxtaposed respectively to the non-magnetic weld inserts 12. In this example of the invention, three solenoid coils 14 are provided on the housing 10 to form solenoids 16, 18 and 20 for the linear motion device. The solenoid coils 14 are each provided with a support structure including tubular magnetic portions 22, 24 and 26 which form a flux path for magnetic flux generated by each of the coils 14. The annuli 22 and 26 are mounted respectively above and below each of the coils 14 and are formed from magnetic material. The annulus 24 is disposed outwardly of the coil 14 in juxtaposed relationship therewith and bridging the outward edges of the adjacent annuli 22 and 26. The solenoids 16, 18 and 20 are formed to be slid over the outward surface of the housing 10 and are fixedly disposed in positions juxtaposed to the non-magnetic inserts 12 of the housing 10 by a plurality of spacers.

The lower end of the housing 10 is provided with an outward flange 28 having threads 30 provided along a portion of the outward surface thereof which are positioned to receive a lower housing member 32. The lower housing member 32 is threadedly secured to the lower flange 28 and is desirably formed at its lower end (not shown) to be secured in a suitable hermetic manner to a pressurized system with which the linear motion device is utilized. The lower housing 32 is provided with an annular canopy 34 which extends in close proximity with a portion of the flange 28 for the purpose of permitting an annular seal weld 36 between the canopy 34 and the flange 28 for sealing hermetically the housing 10 to the lower housing 32.

The solenoids 16, 18 and 20 are fixedly positioned relative to the non-magnetic inserts by means of spacing sleeves 38, 40 and 42. The lower end of the spacing sleeve 38 is mounted on the shoulder 44 formed by the lower flange 28 with the upper end of the spacing sleeve 38 being received by a circumferential shoulder 46 formed on the lower surface of the annulus 26 of the solenoid 20. Similar circumferential shoulders 48 and 50 are provided on the opposed surfaces of the annuli 26 and 22 of the solenoids 18 and 20 respectively to receive the ends of the spacing sleeve 40 thereby to position the solenoid 18 relative to the housing 10. The spacing sleeve 42 is disposed between circumferential shoulders 52 and 54 formed on the opposed surfaces of the adjacent annuli of the solenoids 18 and 16 for the purpose of positioning the upper solenoid 16 relative to the housing 10. An additional spacing member 56 may be similarly mounted on the annulus 22 of the upper solenoid 16 for the purpose of providing a fixed mounting arrangement for the solenoids. The upper end of the spacer 56 may be secured to a suitable annulus such as a locking ring (not shown) which may be threadedly mounted on the outer periphery of the housing 10 and disposed to engage the spacer 56 to prevent relative movement of the solenoids 16, 18 and 20 with respect to the housing 10. In this manner the solenoids may easily be assembled to the linear motion device by merely slipping them over the top of the housing 10 into the position shown in FIGURES 1A–1B and may similarly be removed in the event inspection of the housing 10 is desired. The upper end of the housing 10 is desirably closed off by a cover (not shown) which may be secured to the housing 10 by suitable means to ensure hermetic integrity of the housing 10, for example by welding.

The interior of the housing 10 is formed to receive a pair of gripper assemblies 58 and 60 which are mounted for movement within the housing 10 relative to a toothed linearly movable element or lead screw 62. By energizing the solenoid coils 16, 18 and 20 in a predetermined sequence the gripper assemblies 58 and 60 are movable independently of each other to the latched, coupled and uncoupled positions relative to the lead screw 62 in a manner to be described. Movable gripper supports forming a part of the gripper assemblies 58 and 60, respectively, are movable relative to the interior of the housing 10 and between fixed stop members 64, 66 and 68. The stop members 64, 66 and 68 are fixed in position relative to the housing 10 through the use of spacing sleeves 70 and 72.

In furtherance of this purpose the lower stop member 68 is clamped against a shoulder 69 formed on the housing 10 by a locking ring 71. The locking ring is threadedly secured to the interior of the housing 10 adjacent to flange 28 by complementary threads 74. The lower spacing sleeve 70 is secured at its lower end to the lower stop 68 by complementary threads 76. The intermediate stop member 66 is threadedly secured to the upper end of the lower spacing sleeve 70 by complementary threads at 78. Positioning of the upper stop 64 is achieved by threadedly securing the upper spacing sleeve 72 to the intermediate stop 66 at 80 and to the upper stop 64 at 82. The upper stop 64 and the intermediate stop 66 form portions of the magnetic circuit for the solenoids 16 and 18 respectively and therefore must be formed from magnetic material. The lower stop 68 and the spacing sleeves 70 and 72 do not form portions of the magnetic circuit of the linear motion device and therefore desirably are formed from non-magnetic material. It is to be noted of course that each of the stops 64, 66 and 68 desirably is formed of an annular configuration to surround the lead screw 62 thereby permitting the securing thereof to the respective spacing sleeves 70 and 72.

Figure 2:
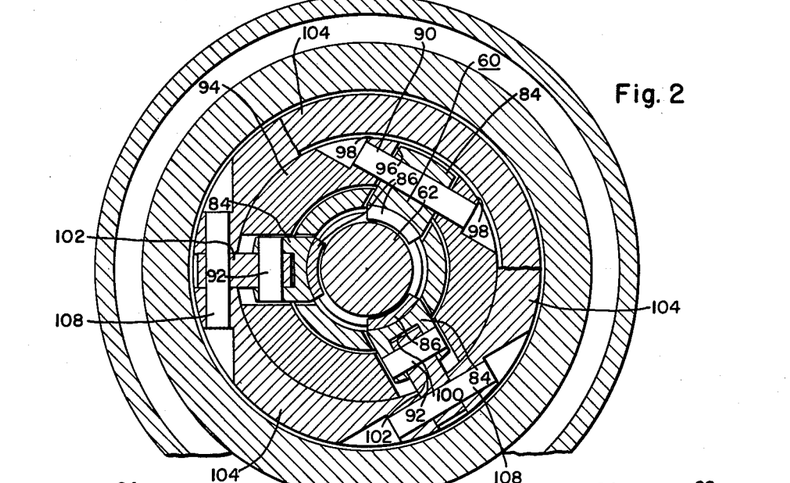
FIG. 2 is a sectional view of the linear motion device illustrated in FIGURES 1A and 1B and taken substantially along the line II—II of FIGURE 1B.

Referring now to FIGURES 1B and 2, the lower gripper assembly 60 is provided with three circumferentially spaced gripper arms 84 with each of the arms 84 being formed from a corrosion resistant material. Each arm 84 is provided at the lower end with an inwardly extending tip 86 which is formed of a size to fit closely between the spaced teeth 88 of the lead screw 62. The tips 86 desirably are formed from an extremely hard material such as Stellite to permit long operating lives therefor. It is to be noted however that the Stellite tip 86 of each gripper arm 84 is formed of a size to provide slight clearance spaces 141 and 143 (FIG. 3) when it is disposed in the groove formed between each pair of adjacent teeth 88. Each of the gripper arms 84 is pivotally mounted at two separate places by means of pivot pins 90 and 92. A movable latch support tube 94 extends above the gripper arm 84 and is provided with three axially extending circumferentially spaced cutouts 96 which are coextensive with and receive the gripper arms 84 respectively. The latch support tube 94 is provided with opposed flanges 98 (FIG. 2) disposed on opposite sides of the cutout 96 to receive the pivot pin 90 therein. In this manner, the gripper arms 84 are pivotally movable relative to the latch support tube 94 with the axis of such pivotal movement being the pivot pin 90. Such pivotal movement of the gripper arms 84 permits movement of the tips 86 through openings 89 in the spacer tube 70 toward the element 62. The lower end of each of the gripper arms 84 is provided with a slot 100 therein which receives one end of a link member 102. The last-mentioned end of the link member 102 is provided with an opening therein which receives the pivot pin 92 to permit pivotal movement of the link member 102 about the axis formed by the pivot pin 92. A movable latch operating magnetic pole or support 104 of annular configuration is disposed between the inward surface of the housing 10 and the outward surface of the latch support tube 94. The lower end of the latch operating support 104 is provided with an inwardly extending groove 106 which receives the adjacent end of the link member 102. The last-mentioned end of the link member 102 is provided with an opening therein disposed in alignment with opposed openings formed on portions of the pole member 104 adjacent the groove 106. A pivot pin 108 is disposed in the last-mentioned aligned openings and passes through the link member 102.

Movement of the gripper arms 84 into and out of engagement with the lead screw 62 is accomplished by movement of the latch operating magnetic pole 104 relative to the latch support tube 94. For example, movement of the pole 104 downwardly relative to the tube 94 (FIG. 1B) would cause the link member to pivot relative to both of its pivot axes. Thus, the pivot pin 108 would move downwardly with the resulting effect being that the pivot pin 92 is moved toward the latch operating pole 104. The last-mentioned movement of the pivot pin 92 would cause the gripper arm 84 to pivot about the pin 90 thereby moving the tip 86 of the gripper arm 84 out of engagement with the teeth of the lead screws 62. The upper gripper structure 58 (FIG. 1A) is illustrated in this last-mentioned position.

With respect to the upper gripper arrangement 58, it is to be noted that the grippers are formed in essentially the same manner as the gripper arms for the lower gripper arrangement 60. Basically the only differences between the upper and lower gripper arrangements are in the formation of the upper gripper support tube 110 and the formation of the latch operating magnetic pole or support 112 for the upper gripper arrangement 58. With those exceptions, the construction of the upper gripper arrangement 58 and the operation thereof are the same as that for the lower gripper arrangement 60.

The upper solenoid 16 is formed to provide a toroidal path for magnetic flux generated thereby. The toroidal magnetic flux path is illustrated by the arrows 114 which pass through the sleeve 24, member 22, housing 10, upper stop 64, latch operating magnetic pole 112, housing 10, lower end piece 26 and returning to the sleeve 24. The flux path indicated by the arrows 114 is forced through the upper stop 64 and pole 112 by the non-magnetic insert 12 juxtaposed to the solenoid coil 14. In the event the housing 10 did not include the non-magnetic inserts, most of the flux would merely pass along the housing 10. The non-magnetic weld insert 12 forces the flux path through the stop 64 and latch operating magnetic pole 112. In addition, rapid build-up of the flux along the magnetic pole 112 may be accomplished by the provision of a plurality of axially extending circumferentially spaced grooves 117 (FIG. 5) and shown by a dotted line in FIG. 1A. These grooves which reduce the value of the eddy currents which inhibit the flux build-up may desirably be formed in all parts of the magnetic flux path for each of the solenoid coils to provide a plurality of circumferentially spaced flux paths in the magnetic circuit for the solenoid coils.

In the embodiment of applicant's invention illustrated in FIGURE 1A, the solenoid 16 is shown with its coil 14 deenergized. The solenoid 16 is provided with two poles which are movable relative to each other. One of the poles comprises the annular stop member 64 with the other pole comprising the gripper operating pole or support 112. The upper surface of the annular gripper operating pole 112 is provided with a relatively thin wear resistant non-magnetic washer 116 which is adapted to move into engagement with the juxtaposed surface of the annular upper stop 64. The non-magnetic washer 116 serves to reduce the decay time of the magnetic flux in the gaps 118 upon deenergization of the coil 16 to speed up movement of magnet pole 112. Accordingly, upon energization of the coil 14 of the solenoid 16, the air gap 118 tends to close and the solenoid 16 is designed to be of such size as to cause complete closing of the air gap 118. Closing movement of the air gap 118 is resisted by resilient means such as a spring 120 which is disposed in compression between opposed surfaces of the upper stop 64 and the gripper operating magnetic pole 112. The spring 120 however is designed of such size as to increase the air gap 118 to a maximum only when the solenoid 16 is deenergized. The magnetic force between the poles 64 and 112 created by the solenoid 16 is of such magnitude as to overcome the spring force of the spring 120.

A ring member 122 is secured to the inner surface of the spacing sleeve 72 and abuts a shoulder 124 formed thereon. Resilient means such as a spring 126 is disposed between the ring member 122 and the upper end of the latch support tube 110. The spring 126 is desirably under compression and resists upward movement of the latch support tube 110 toward the ring member 122. Accordingly, upon energization of the solenoid 16, the air gap 118 begins to close. Inasmuch as the upper stop 64 is fixedly positioned, closing of the air gap 118 is accomplished solely by upward movement of the gripper operating pole 112 toward the stop 64. The gripper operating pole 112 is provided with a lower annulus 128 threadedly secured thereto at 130 which is formed to receive a pivot pin 132 upon which there is mounted a link member 134. The link member 134 is capable of moving pivotally about the lock pin 132. Similarly, the link member 134 is pivotally secured to the latch arm 136 of the upper gripper arrangement 58 in the manner similar to that described in connection with the lower gripper arrangement 60. The gripper arm 136 is pivotally mounted on the gripper support tube 110 by a lock pin 138 which functions similarly to the lock pin 90 of the lower gripper arrangement 60.

Upon closing of the air gap 118, the lock pin 132 is moved upwardly into substantial alignment with the lock pin 135 causing the gripper arm 136 to pivot about the lock pin 138 so that its Stellite tip 140 moves through an opening 141 in the spacing tube 72 to a position between adjacent teeth 88 of the lead screw 62. During this portion of the closing of the air gap 118 only the last described movement takes place because the gripper support tube 110 is restrained from corresponding upward movement by the spring 126. It will be noted however that the lower end of the member 128 is provided with an inwardly extending flange 142 thereon which is disposed in vertical alignment with the shoulder 144 of the gripper support tube 110. The distance of travel of the flange 142 until it is in engagement with the shoulder 144 is constructed to be slightly smaller than the air gap 118 so that upon the final closing movement of the air gap 118, the flange 142 moves the gripper support tube 110 upwardly against the spring force 126. The particular need for this last-mentioned movement of the gripper support tube 110 will be described hereinafter in conjunction with the description of the operation of the linear motion device.

Viewing FIG. 3, it will be seen that the flange 142 engages the shoulder 144 in the manner contemplated by this invention while the air gap 118 is not completely closed. This final closing movement of the air gap results in movement of the tip 140 of the gripper 136 axially upwardly into engagement with the adjacent teeth 88 of the lead screw. The position of the latch tip 140 when the air gap 118 is completely closed is illustrated in FIGURE 4. Upward movement of the latch support tube 110 by the flange 142 is of such distance as to comprise twice the distance of the clearance 143. Thus, the illustration of the position of the tip 140 in FIGURE 3 comprises a showing of the latch arm 136 in the "coupled" position. The final closing of the gap 118 moves the tip 140 into engagement with the adjacent tooth 88 and such movement of the tip 140 continues so that the tip receives the load of the lead screw 62 thereon. The position wherein the tip 140 is under the load of the lead screw 62 has been defined as the "latched" position. The portion of movement of the tip 140 after closing of the clearance 143 results in the placing of the tip 140 under the load of the lead screw and the remainder of the closing movements of the air gap 118 results in the lifting of the lead screw 62 by the tip 140 a distance equal to the width of the gap 143. The effect of this last-mentioned movement is to provide a gap equal in size to the gaps 141 and 143 between the tip 86 of the lower latch 84 and the adjacent teeth 88.

The lower solenoid 14 controls the movement of the lower gripper arrangement 60 between the latched, coupled and uncoupled positions. As illustrated in FIGURE 1B, the solenoid 20 is energized. The poles of the lower solenoid 20 comprise the latch operating magnetic pole 104 and a lift pole 142, both of which are formed from magnetic material. Thus, when the solenoid 20 is deenergized an air gap exists between the lift pole or support 142 and the latch operating pole or support 104. The length of the last mentioned air gap is defined by the upper surface 144 of a spring support plunger 146 which is axially aligned with the latch operating pole 104. Resilient means such as a spring 148 is mounted in compression between opposed surfaces of the lift pole 142 and the operating pole 104 to ensure the opening of the air gap between the last mentioned pole upon deenergization of the solenoid 20. A non-magnetic washer 150 is placed on the upper surface of the latch operating pole 104 and serves the same function as the washer 116. Upon deenergization of the solenoid 20, the latch operating pole 104 moves downwardly until its lower surface engages the surface 144 of the spring support plunger 146. The pivot pin 108 also moves downwardly causing the link 102 to pivotally move in a counterclockwise direction about the pivot pin 108 with the resulting effect being that the tip 86 of the gripper arm 84 is swung outwardly out of engagement with the adjacent tooth 88 of the lead screw 62. Upon completion of this last-mentioned motion, the latch arm 84 is located in the unlatched position similar to that shown for the latch arm 136 in FIG. 1A.

As will be pointed out hereinafter, deenergization of the solenoid 20 normally would not be permitted while the latch arm 84 is in the latched position. Before deenergization of the solenoid 20 is permitted, the solenoid 16 will be energized so that the gripper arm 136 is in the latched position (FIG. 4) which would result in the location of the gripper arm 84 in the coupled position.

As illustrated in FIGURE 1B, the gripper support tube 94 is threadedly mounted on the lift pole 142 at 152. The latch support tube 94 is provided at its lower end with an extension 154 disposed below the gripper arms 84 and having a threaded outer side wall 156. Complementary threads are formed on the spring support plunger 146 to permit the securing of the spring support plunger 146 to the extension 154 at the wall 156. The lower end of the spring support plunger 146 is provided with an inwardly extending circumferential flange 158 which extends to a position closely adjacent the outer surface of the spacer tube 70. An annular washer 160 is secured against an outwardly extending shoulder 162 formed on the spacer tube 70 and disposed between the lower end of the extension 154 and the flange 158. Resilient means such as a pull down spring 164 is disposed in compression between the stop 160 and the flange 158 to exert a constant downward force on the flange 158 with the last-mentioned downward force also being exerted on the lift pole 142.

The intermediate or lift solenoid 18 provides a flux path similar to the flux path 114 of the solenoid 16. The opposed poles of the lift solenoid 118 comprise the central stop 66 and the lift pole 142 with the air gap for the lift solenoid 18 being disposed between the adjacent surfaces of the last-mentioned poles. In FIGURES 1A–1B, the lift solenoid 18 is shown in its energized position with the air gap between its poles 66 and 142 being closed. A non-magnetic washer 166 desirably is mounted between the opposed surfaces of the poles. The function of the non-magnetic washer 166 is the same as that of the washers 116 and 150. Deenergization of the lift coil 18 would result in the opening of the air gap between the poles 66 and 142. The opening of this air gap would be assisted by the pull down spring 164. The size of the air gap would be defined by the distance between the lower surface 168 of the plunger 146 and the upper surface of the lower stop 68.

Two or more washers 170 may be provided on the upper surface of the lower stop 68 to dampen the shock when surface 168 of the plunger 146 contacts the washers. Fluid trapped between the washers will be squeezed out at high velocity and absorb some of the kinetic energy before a solid stop is achieved.

Desirably, the gap for the lift solenoid 18 is constructed to be exactly equal to the thread pitch of the lead screw 62 for the purpose hereinafter described.

Operation of the Linear Motion Device

The sequence of energization of the solenoids 16, and 20 together with the resulting movements of the upper and lower gripper arrangements 58 and 60 will now be described for the purpose of providing incremental upward movement of the lead screw 62.

In one embodiment of this invention, the clearance 141 and 143 between the teeth 88 and the gripper tip may be sized as $\frac{1}{32}$ inch. The pitch of the lead screw 62 or the distance between adjacent teeth 88 desirably is $\frac{3}{8}$ inch and the gap 118 is $\frac{7}{16}$ inch. To provide incremental upward movement of the lead screw 62, it will be assumed that the linear motion device is in the operating state illustrated in FIGS. 1A–1B, that is the solenoid 16 is deenergized and the solenoids 18 and 20 are energized.

Upward incremental movement of the lead screw 62 will begin by energizing the upper solenoid 16. Such energization of the upper solenoid 16 will establish a magnetic field in the gap 118 tending to close the latter. As a result, magnetic pole 112 moves towards stop 64 and the latch arms 136 are driven toward the lead screw 62 by pivotal movement of the links 134 until the tips 140 of the latch arms 136 assume the position shown in FIG. 3 wherein a clearance 141 exists between the adjacent teeth 88 and the tips 140. During the last-mentioned movement the tips 140 of the latch arms 136 do not come into contact with the teeth 88 of the lead screw 62 and the arms 136 are in the coupled position. The axial position of the latch arms 136 remains unchanged during this period since the latch support tube 110 is held in its original position by the spring 126. At this point of the travel (in this example $\frac{3}{8}$ inch) the flange 142 at the lower end of the extension 128 engages the shoulder 144 adjacent the lower end of the support tube 110 with the consequence that the support tube 110 and with it the latch arms 136 is forced upwardly during the last part of the magnetic travel ($\frac{1}{16}$ inch) until the air gap 118 is completely closed. This last $\frac{1}{16}$ inch of travel takes up the clearance 143 of $\frac{1}{32}$ inch placing the arms 136 in the latched position and moves the lead screw upwardly to an increment of $\frac{1}{32}$ inch thereby transferring the load created by the weight of the lead screw 62 from the lower latch arms 84 to the upper latch arms 136. A clearance of $\frac{1}{32}$ inch will now exist between the tips 86 of the lower latch arms 84 and the adjacent teeth 88 and the arms 84 are now in the coupled position. Thus, the upper gripper arms 136, by energization of the solenoid 16, have moved from their original unlatched position through the coupled position and then to the latched position, resulting in the movement of the lower arms 84 from the latched position to the coupled position.

The next step in sequence of operation is to deenergize the lower solenoid 20. This permits the lower latch operating magnetic pole to drop under the impetus of the spring 148 to move the gripper arms 84 from the coupled position to the uncoupled position with the upper gripper arms 136 remaining in the latched position. It is to be noted that the movement of the gripper arms 84 to the unlatched position is permitted in this invention without making contact with the teeth 88 of the lead screw 62 thereby preventing wear on these parts. The lift solenoid 18 is now deenergized and the entire lift magnetic assembly including the lift pole 142, the latching operating magnetic pole 104 and the spring support plunger 146 moves downwardly to its bottom position by impetus of the spring 164 until the lower surface 168 engages the damping washers 170.

To further dampen the shock caused by the sudden stopping of the lift pole and its associated parts when the surface 168 of the plunger 146 engages the washers 170, dashpot means are formed adjacent the contacting parts. In furtherance of this purpose, the lower stop 68 adjacent the inner surface of the housing 10 is provided with an upwardly extending circumferential projection 174 and the outer surface of the spring support plunger 146 is complementarily shaped at 176 so that any fluid entrapped between the lower surface 168 and the trimming washers 170 is forced to escape through a gradually decreasing annular orifice between the projection 174 and the surface 176. Upon closing of the gap between the poles 66 and 142, fluid is permitted to move into the space 177 by virtue of a plurality of axially extending, aligned openings 178 in the lower stop 68 and the locking ring 71. Since the washers 170 are not secured to the lower stop 68, entrance of fluid into the space 177 is permitted as the washers 170 will be lifted away from the stop 68 by virtue of the pressure difference between the space 177 and the opening 178. Of course, during downward movement of the surface 168, the openings 178 are covered by the washers 170, which, as previously described, provide additional damping at the moment of impact.

The space 177 is desirably of the same height as the spacing between adjacent teeth 88 of the lead screw 62, so that the tips 86 of the latch arms 84 are now positioned directly in line with the center of the next lower groove on lead screw 62 when the space 177 is closed. Energization of the lower solenoid 20 moves the latch operating pole 104 into engagement with the lower end of the lift pole 142 moving the latch arms 84 from the unlatched position to the coupled position, so that the tips 86 of the latch arms 84 are not in actual contact with the teeth 88. The upper solenoid 16 now is deenergized causing the opening of the gap 118 and the downward movement of the latch operating pole 112 and the gripper support tube 110 under the impetus of the springs 120 and 126 respectively. It is to be noted that the speed of the downward movement of the gripper support tube 110 is limited by the speed of movement downwardly of the flange 142. The force exerted by the spring 126 is of such a magnitude as to permit more rapid lowering of the gripper support tube 110 than the speed of lowering of the magnetic pole piece 112. On this basis, for the first $\frac{1}{16}$ inch of travel of the latch support tube 110 carrying with it the gripper arms 136, the flange 142 defines the upper limit of the speed of downward movement of the gripper support tube 110. During the first $\frac{1}{16}$ inch of travel the gripper support tube 110 and the pole piece 112 moves substantially as a unit. When the gripper support tube 110 has moved the first $\frac{1}{16}$ of an inch, the lower end 180 thereof engages the trimming washer 172 and prevents further downward movement of the support tube 110. The first $\frac{1}{32}$ inch of downward movement also moves the lead screw 62 downwardly to absorb the clearance between the lead screw teeth and the tip 86 of the lower gripper arm 84 placing the lower gripper arms in the latched position. The second $\frac{1}{32}$ inch of movement completes the freeing of the tip 140 of the upper gripper arms 136 from contact with the lead screw 62. During the latter part of the travel of the pole 112 ($\frac{3}{8}$ inch) the tips 140 are withdrawn from the grooves between the lead screw teeth moving the grippers 136 to the unlatched position. It will therefore be noted that the deenergization of the upper solenoid 16 causes sequential movement of the upper gripper arms 136 from the latched position, through the coupled position and to the unlatched position. Incremental movement of the lead screw 62 upwardly is completed by energizing the lift solenoid 18 until the air gap between the pole 66 and the pole 142 is closed.

To continue incremental movement in the upward direction the whole cycle as desired above is merely repeated.

Downward movement of the lead screw 62 is achieved by sequentially energizing and deenergizing the solenoid coils 16, 18 and 20 in the following manner.

With the linear motion device in the position shown in FIGURES 1A–1B, the first step to obtain downward incremental movement is to deenergize the lift coil 18 causing the lower gripper arms 84 and the lead screw 62 to move downwardly until the surface 168 of the plunger 146 engages the washers 170. Next, the solenoid coil 16 is energized moving the tips of the gripper arms 136 to the coupled position between adjacent teeth 88 of the lead screw until the flange 142 engages the shoulder 144, and then lifting the lead screw 62 and the gripper arms 136 for an additional 1/16 inch to move the tips 140 from the coupled position to the latched position and whereupon the tips 86 of the lower gripper arms 84 are placed in the coupled position. The lower solenoid 20 is deenergized moving the gripper arms 84 from the coupled position to the unlatched position. The lift coil 18 is then energized moving the lift pole 142 into engagement with the stop 66 with the lift pole 142 also moving the gripper arms 84 upwardly for a distance equal to one pitch. The lower solenoid 20 is then energized moving the gripper arms 84 from the unlatched position to the coupled position. Finally, the cycle is completed by deenergizing the solenoid 16 which accomplishes the movement of the upper gripper arms 136 to the coupled position, thereby placing the gripper arms 84 in a latched position and thence moving the gripper arms 136 to the unlatched position. The cycle is then repeated to obtain further incremental downward movement of the lead screw 62.

It is to be noted that at all times during the operation of the linear motion device, the gripper arms 84 and 136 are moved to the unlatched position from the coupled position and not from the latched position. In this manner there is no direct frictional engagement between the teeth of the lead screw 62 and the tips of the gripper arms. Thus, substantially no wear on the engaging parts of the gripper arms and the lead screw takes place during operation of the linear motion device. This results in a linear motion device having long life operation and requiring little or no maintenance or service.

Figure 6:
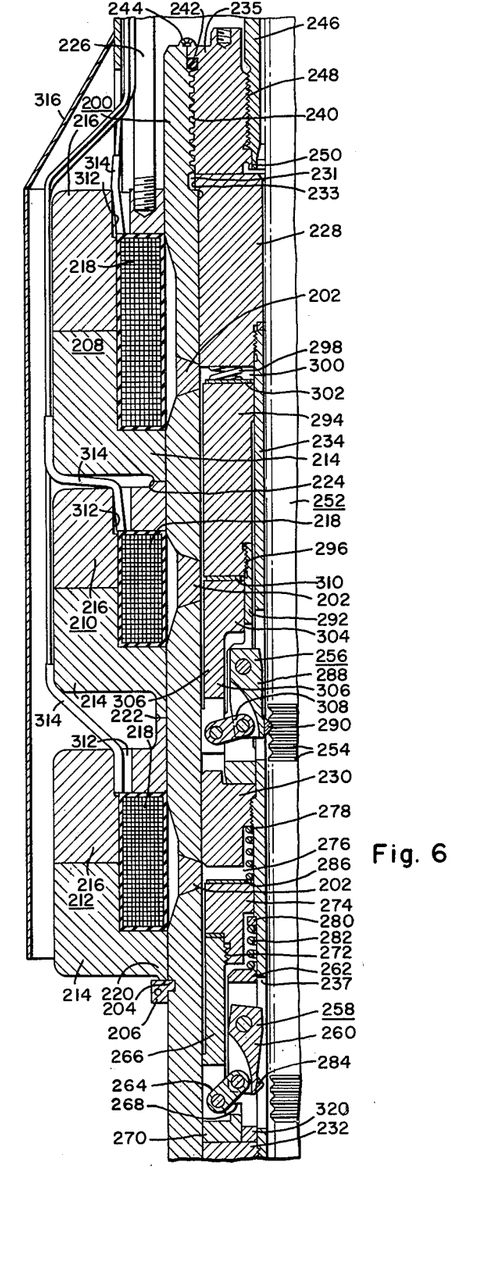
FIG. 6 is a fragmentary view in section of a modified linear motion device constructed pursuant to the principles of this invention.

Referring now to the embodiment of my invention illustrated in FIGURE 6, it is to be noted that a number of innovations have been incorporated herein which streamline the device and which result in a decrease in overall size thereof. An outer pressure tubular housing 200, similar to the housing 10, is formed from magnetic material and includes a plurality of circumferential weld inserts 202 axially spaced therealong and positioned adjacent the solenoids of the linear motion device. The housing 200 is provided with a circumferential slot 204 therein which receives an annular stop 206 with the latter serving as the lower mount for the solenoids. Three solenoid coils are provided in this arrangement of the invention. The upper solenoid comprises a lift solenoid 208. The intermediate and lower solenoids 210 and 212 comprise upper and lower gripper operating solenoids, respectively. Each solenoid is provided with an annular bipartite housing with each housing part having a generally L-shaped cross section. The bipartite housing is formed from opposed L-shaped members 214 and 216 mounted in opposed relationship and forming an annular space therebetween in which there is disposed a solenoid coil 218. The lower solenoid housing part 214 for the lower gripper solenoid 212 is provided with a downwardly extending rim 220 disposed to engage the annular stop 206. The adjacent housing parts of adjacent solenoids are provided with circumferential extensions at 222 and 224 which abut and thereby position each of the solenoids 208, 210 and 212 relative to the housing 200 and opposite one of the non-magnetic weld inserts 202, respectively.

Means for fixedly positioning the solenoid housing adjacent the ends of the solenoid 208 are provided. One such means may comprise tie rods 226 which may be suitably secured to a locking ring member (not shown) mounted adjacent the top of the linear motion device. In this embodiment of the invention an upper stop member 228, an intermediate stop member 230 and a lower stop member 232, each of annular configuration, may be provided within the housing 200 and closely adjacent the inner surface thereof. The last-mentioned stop members 228, 230 and 232 serve the same function as the stop members 64, 66 and 68. The stop members are fixedly mounted in axially spaced relationship by a tubular spacer 234 threadedly connected to each of the stop means 228, 230 and 232.

In this embodiment of the invention only one tubular spacer 234 is utilized with the assembly of stop members and tubular spacer being mounted from the upper end of the housing 200. In furtherance of this purpose, a circumferential recess 231 is provided in the inner surface of the housing 200 and the stop 228 is provided with an annular projection 233 disposed in the recess 231. A clamping means such as ring 235 is threadedly secured to the housing 200 at 240 by complementary threads formed on the inner surface of the housing 200 and on the outer surface of the clamping ring 235. Means for sealing the housing between the clamping ring 235 and the housing 200 may be provided. One example of a suitable sealing means comprises an O-ring 242 disposed in complementary recesses formed in the housing 200 and the clamping ring 235. A seal weld such as a canopy ring 244 may also be provided on the adjacent surfaces of the housing 200 and the clamping ring 235. One example of a suitable seal means 244 is shown and described in detail in Patent 2,805,789, issued to Kreh et al. and assigned to Westinghouse Electric Corporation. The lower surface of the clamping ring 235 engages the upper stop 228 to force the projection 233 into engagement with the lower wall of the recess 231.

An upper housing 246, only part of which is shown in FIGURE 6, is threadedly secured to the inner circumference of the locking ring 235 at 248. This housing 246 desirably encloses the interior of the linear motion device to permit the latter to be subjected to substantial internal pressures. Accordingly, a suitable closing means is provided at the upper surface (not shown) of the upper housing 246. To ensure the integrity of the housing at the position of engagement of the housing 246 and the locking ring 235, a circumferential seal weld desirably is provided at 250 to seal hermetically the interior of the linear motion device.

In this embodiment of the invention a drive rod or lead screw 252 is provided of a form similar to the lead screw 62 and includes a plurality of axially spaced teeth 254 which extend circumferentially about the outer surface of the drive rod 252. A pair of gripper assemblies are provided to engage the lead screw 252 and to provide incremental linear movement thereof in opposite directions. The upper gripper assembly is denoted by reference character 256 and the lower gripper assembly is denoted by reference character 258. Each of the gripper assemblies may be formed in the same manner as that illustrated in FIGS. 1 through 4 with each assembly including a plurality of pivotally movable gripper arms. The lower gripper assembly is provided with at least one gripper arm 260 which is pivotally secured to a support annulus or tube 262. A link member 264 is pivotally secured to the gripper arm 260 and to a second support tube 266. The support tube 266 extends downwardly to a position of engagement with the lower stop 232. The support annulus 262 desirably is provided with a downwardly facing shoulder 268 which is disposed to be engaged by a circumferential flange 270 formed on the lower end of the support tube 266 and underlying the shoulder 268. The flange 270 desirably is spaced from the shoulder 268 when the solenoid 212 is deenergized. The support tube 266 is secured by suitable means such as by threading at 272 to a gripper operating pole 274. The gripper operating pole 274 and the intermediate stop 230 comprise the poles for the solenoid 212. The pole 274 is movable, upon energization of the solenoid 212 toward the lower surface of the stop 230 to close the air gap 276 therebetween. Biasing means such as a spring 278 is disposed in compression between the stop 230 and the upper surface of the pole 274. Load transfer means are coupled to the lower gripper assembly 258 and comprises a stop 280 secured against a shoulder formed on the outer surface of the spacer tube 234 together with a biasing means such as a coil spring 282 which is compressed between the stop 280 and the upper surface of the gripper support annulus 262. The biasing means 282 serves the same function as the spring 126 in the first described embodiment of this invention in that upon energization of the solenoid 212, the gripper support annulus 262 does not move upwardly against the force of the spring 282 until the flange 270 engages the shoulder 268.

Energization of the lower gripper operating solenoid 212 creates a magnetic flux through the air gap 276 which tends to close the latter. The pole 274 moves upwardly toward the fixed stop 230 against the force of the coil spring 278.

It is to be noted that the flux path created by energization of the solenoid 212 is essentially similar to the flux path 114 illustrated in detail for the solenoid 16. In addition, the poles 274 and 230 of the solenoid 212 as well as the other solenoids in FIG. 6 may include circumferentially spaced axially extending slots (not shown) similar in shape and purpose to the slots 116 illustrated in FIG. 5.

During the initial upward movement of the pole piece 274 to close the air gap 276, the support annulus 262 remains stationary and the gripper arm 260 is swung inwardly through an opening 237 in the spacer tube 234 until the tip 284 thereof is in the coupled position. At that point, the flange 270 engages the shoulder 268 and the pole 274 carries the support annulus 262, the gripper assembly 258 and the drive rod 252 upwardly for a distance sufficient to move the lower gripper assembly 260 to the latched position and to place the upper gripper assembly 256 in the coupled position. A suitable non-magnetic washer 286 is mounted on the upper surface of the pole 274 for the purpose of ensuring rapid decay of flux when the solenoid 212 is deenergized.

The upper gripper assembly 256 is provided with a plurality of pivotally movable gripper arms 288 having wear resistant inwardly extending tips or projections 290 thereon, with the latter projections being disposed to engage the teeth 254 of the drive rod 252. The upper gripper assembly support tube 292 desirable is connected to a movable pole piece 294 such as by threads 296. The upper pole piece 294 forms a movable pole of the lift solenoid 208. The other pole of the lift solenoid 208 comprises the upper stop 228. Resilient means such as coil spring 298 desirably is disposed in the gap 300 of the lift solenoid 208. The resilient means or spring 298 has one end thereof engaging a non-magnetic washer 302 placed on the upper surface of the pole 294 and has its other end (not shown) disposed in a recess (not shown) formed in the lower surface of the upper stop 228. In this manner, when the gap 300 is closed by energizing the solenoid 208, the spring is compressed and recedes entirely into the last mentioned recess. Movement of the pole 294 to close the gap 300 results in upward movement of the support tube 292 together with the upper gripper assembly 256. In the event the arms 288 of the upper gripper assembly 256 are in the latched position relative to the drive rod 252, the upward movement of the pole 294 results in the lifting of the lead screw 252. Pivotal movement of the upper gripper assembly 256 into and out of engagement with the drive rod 252 is accomplished by the energization or deenergization of the upper gripper solenoid 210. The upper gripper solenoid 210 includes as a pole thereof the pole 294 together with a gripper operating pole 304. The gripper operating pole 304 includes a downwardly extending projection 306 which pivotally supports one end of a link member 308. The link member 308 is pivotally mounted at its other end on the lower end of the gripper arm 288. A non-magnetic washer 310 is supported on the gripper operating pole 304. The upper gripper operating solenoid 210 is illustrated in FIGURE 6 as energized, so that the air gap between the poles 294 and 304 thereof is completely closed. Deenergization of the solenoid 210 would result in a downward movement of the pole 304 relative to the upper pole 294 and would cause pivotal movement of the gripper arm 288 about the link member 308 out of engagement with the teeth 254 of the drive rod 252, thereby moving the arm 288 to the unlatched position.

Each of the magnetic annuli 216 of the solenoids 208, 210 and 212 desirably is provided with an opening 312 therein which permits the passage of suitable conductors 314 therethrough for the purpose of energizing the coils of the solenoids 208, 210 and 212 respectively. An outer cover 316 of generally annular configuration may be mounted to enclose the outer periphery of the solenoids 208, 210 and 212 for the purpose of preventing possible damage to the conductors 314.

It is to be noted of course that the air gaps for each of the solenoids desirably are disposed in positions juxtaposed to the non-magnetic inserts 202 of the housing 200. It is to be further noted that in this embodiment of this invention the lower gripper assembly provides the load transfer function of the linear motion device with the lifting and lowering functions thereof being performed by the upper gripper assembly 256.

*Operation*

Operation of the linear motion device illustrated in FIGURE 6 is achieved by sequentially energizing and deenergizing the solenoids 208, 210 and 212 in a predetermined manner. For example if incremental upward movement of the drive rod 252 is desired, and if the linear motion device is in the position illustrated in FIGURE 6, the last mentioned incremental motion will be achieved in the following manner.

In FIGURE 6 the upper gripper assembly 256 is illustrated in the latched position and the lower gripper assembly 258 is illustrated in the unlatched position. The solenoid 208 is illustrated as deenergized, the solenoid 210 is illustrated as energized and the solenoid 212 is illustrated in a deenergized state. Incremental upward movement is begun by energizing the lift solenoid 208 to close the gap 300. The upper gripper assembly together with the drive rod 252 is moved incrementally upwardly for a distance equal to the pitch between adjacent teeth 254 thereof. Next, the lower gripper operating solenoid 212 is energized moving the lower gripper assembly 258 from the unlatched position through the coupled position and to the latched position as hereinbefore described. This movement of the lower gripper assembly 258 transfers the load or weight of the drive rod 252 entirely to the lower gripper arm 260 so that the upper gripper arm 288 is now in the coupled position. The upper gripper operating solenoid 210 is deenergized resulting in downward movement of the pole 304 and pivotal outward movement of the upper gripper arm 288 from the coupled position to the unlatched position. The lift solenoid 208 is then deenergized to open the gap 300 under the force of the spring 298. This last mentioned movement includes downward movement of the pole 304 for a distance equal to the length of the gap 300 retaining the gripper arm 288 in the unlatched position. The upper gripper operating solenoid 210 then is energized to move the upper gripper arm inwardly toward the lead screw from the unlatched position to the coupled position. Finally, the lower gripper operating solenoid 212 is deenergized first causing the lower gripper arm 260 to move downwardly under the force of the spring 282 until the weight of the drive rod 252 rests entirely upon the upper gripper arm 288, placing the latter in the latched position and until a clearance exists between the tip 284 of the gripper arm 260 and the adjacent teeth 254 of the lead screw so that the arm 260 is in the coupled position. Downward movement of the support tube 262 and the gripper arms 260 is now prevented by the engagement of the lower end 320 of the support tube 262 with the upper surface of the lower stop 232. Downward movement of the pole 274, however, continues causing the gripper arm 260 to move outwardly away from the drive rod 252 to the unlatched position. At this stage the linear motion device is now in its initial condition and further upward incremental movement is achieved by repeating the complete cycle.

Downward incremental movement of the FIGURE 6 embodiment of this invention is achieved by sequentially energizing and deenergizing the solenoids 208, 210 and 212 in a predetermined manner. The sequence of operation, with the linear motion device being in the state shown in FIGURE 6, is as follows:

First, the lower gripper operating solenoid 212 is energized moving the lower gripper arm 260 from the unlatched position through the coupled position and to the latched position, the beforementioned movement also resulting in the placing of the upper gripper arms 288 from the latched position to the coupled position. Next, the upper gripper operating solenoid 210 is deenergized moving the upper gripper arm 288 from the coupled position to the unlatched position. The lift solenoid 208 is energized to close the gap 300 thereby moving the upper gripper arm 288, while retaining the same in the unlatched position an upward increment equal to the pitch between the teeth 254 of the drive rod 252. The upper gripper operating solenoid 210 now is energized moving the pole 304 into engagement with the pole 294, the last-mentioned movement resulting in the placing of the upper gripper arm 288 in the coupled position. The lower gripper operating solenoid 212 now is deenergized. As a result the lower gripper arm 260 is moved from the latched position to the coupled position, placing the upper gripper arm 288 in the latched position, and then the lower gripper arm 260 also moves from the coupled position to the unlatched position. The lift solenoid 208 now is deenergized moving the upper gripper arms 288 downwardly a distance equal to one thread pitch under the force of the spring 298 and the weight of the lead screw 252. Further downward incremental movement of the drive rod 252 is achieved by repeating the above-described cycle.

It is to be noted that resilient means (not shown) may be disposed between the poles 294 and 304 in order to ensure separating of the poles upon deenergization of the upper gripper operating solenoid 210.

Linear motion devices of this invention can be utilized in applications wherein emergency conditions exist requiring the lead screw 62 or 252 to be moved downwardly as rapidly as possible, when the devices are mounted in generally vertical positions. This condition may be deemed the "scram" condition. This invention contemplates the existence of the scram condition and provides for rapid lowering of the lead screw 62 or 252 by merely deenergizing all of the solenoids of the linear motion device. It will be seen that when the solenoids 16, 18 and 20 of FIGURES 1A–1B are deenergized, both of the gripper assemblies 58 and 60 are moved to the unlatched positions permitting free downward movement under the force of gravity of the lead screw 62. Similarly, when the solenoids 208, 210 and 212 are deenergized simultaneously, the gripper assemblies 256 and 258 are both placed in the unlatched position, resulting in free fall of the drive rod 252.

It is to be realized that numerous modifications and changes may be made to the apparatus illustrated and described in the specification and drawings. These modification may fall within the broad spirit and scope of this invention. Accordingly, it is specifically intended that the detailed description of the embodiments of this invention be interpreted as illustrative of the invention and not limitive thereof.

I claim as my invention:

1. In a linear motion device, the combination comprising a linearly movable element having a plurality of axially spaced projections thereon, a pair of gripping members axially spaced relative to said element, mounting means for said gripping members comprising two pairs of independently movable supports said gripping members being respectively movable to positions between said projections, means pivotally connecting each of said gripping members to one of said pairs of independently movable supports, respectively, means for axially moving one support of one of said pairs of said supports relative to the other support of said one pair to pivotally move its associated gripping member to one of said positions, and resilient means engaging said other support for preventing axial movement thereof during only a portion of the axial movement of said one support.

2. In a solenoid operated linear motion device, the combination comprising a tubular housing, a plurality of solenoid coils mounted in axially spaced relationship along said housing, each of said solenoid coils being of annular configuration with said tubular housing passing through the central openings therein, a bipartite magnetic structure for each of said solenoid coils, each of said magnetic structures including a pair of ring members disposed on the opposed ends of said solenoid coils respectively, the outer ends of each of said ring structures extending outwardly beyond the outward surfaces of said coils, each of said ring structures having an integral outer circumferential projection extending axially to overlie the outward end of its associated solenoid coil with the extremities of said projections being in engagement, whereby the magnetic structures for each of said solenoid coils are of a generally U-shaped cross sectional configuration, each of said ring members having an integral, inward circumferential projection extending axially adjacent the outer surface of said housing in a direction opposite the direction of said outer circumferential projection, said solenoids being disposed with the adjacent ends of adjacent circumferential inner projections being in engagement, and means fixedly securing the remote ones of said ring members in position relative to said housing, whereby each of said solenoid coils is retained in a fixed axial position with respect to said housing.

3. In a linear motion device, the combination comprising a housing of tubular configuration, a linearly movable element disposed in said housing, a stop member fixedly mounted on the inner wall of said housing in spaced relationship with said linearly movable element, said linearly movable element having a plurality of spaced teeth thereon, a gripper member, a pair of movable support members for said gripper member mounted in said housing adjacent said stop member, motive means for moving one of said support members toward and away from said stop member, means for pivotally mounting said gripper member on said support members, said lastmentioned means being formed to cause pivotal movement of said gripper member into and out of engagement with said teeth upon movement of said one support member relative to the other of said support members, and motion resisting means engaging said other support member for preventing the movement of said other support member during a portion of the movement of said one support member.

4. In a linear motion device, the combination comprising a tubular outer housing, a tubular inner housing mounted in said outer housing, a ring connected between said inner and outer housing members, a fluid substantially filling said housing, an annular plunger mounted in the annular space between said inner and outer housing members, said plunger being movable in said annular space toward and away from said ring, the axially extending walls of said plunger being closely received between the walls of said inner and outer housing members, at least one of said walls being tapered to narrow the clearance between said plunger and one of said inner and outer housing members, said ring having an opening formed therein for connecting the annular space between said housing members, said ring and said plunger to the remainder of the interior of said housing, an annular washer mounted in said last-mentioned space and disposed to overlie the adjacent end of said ring opening, said washer being mounted to move freely toward and away from said end of said opening, whereby the speed of movement of said plunger toward said ring is impeded by dashpot action between said one tapered wall and said plunger and whereby fluid is admitted to said space through said opening when said plunger moves away from said ring.

5. In a linear motion device, the combination comprising a linearly movable element having a plurality of axially spaced projections therein, a pair of gripping members axially spaced relative to said element, each of said gripping members being pivotally mounted on a pair of independently movable supports at a normal position spaced from said projections, one support of one of said pairs of supports being movable axially relative to the other support of said one pair of supports to move pivotally a portion of said one gripping member to a position between adjacent projections on said element, first motive means for moving said one support of said one pair relative to said other support of said one pair to move said one gripper portion to a position between said adjacent projections, said projections each being spaced in the axial direction a distance greater than the axial dimension of said one gripping member portion when the latter is in said last-mentioned position, second motive means operable to move said one pair of supports and said one gripping member axially for a distance equal to the axial spacing between said projections, one support of the other of said pairs of supports being movable axially relative to the other support of said other pair of supports to move pivotally a portion of the other of said gripping members to a position between adjacent projections on said element, the axial dimension of said last-mentioned gripper portion when in said last-mentioned position being less than the distance between adjacent ones of said projections, third motive means for moving said one support of said other pair relative to said other support of said other pair to move pivotally said portion of said other gripper member between adjacent projections, resilient means fixedly positioned in engagement with said other support of said other pair of supports and biased against said last-mentioned other support in a direction to prevent axial movement of said last-mentioned other support during a portion of the axial movement of said one support of said other pair of supports, said last-mentioned one support having a projection formed thereon and disposed in a position to engage said other support of said other pair when said one support of said other pair moves a predetermined axial distance relative to said other support of said other pair, said last-mentioned axial distance being of a length sufficient to cause pivotal movement of said other gripping member to a position where said portion of said other gripping member is disposed between adjacent ones of said teeth, said third motive means being formed to continue the aforesaid axial movement of said one support of said other pair with said support projection in engagement with said other support of said other pair, said projection being formed, when in engagement with said other support of said other pair, to move said last-mentioned other support and said other gripping member axially in a direction opposite to the biasing direction of said resilient means, said element being positioned whereby said portion of each of said gripper means, when respectively moving to a position between adjacent ones of said projections of said element is disposed between such projections without engaging the latter so that a clearance therebetween exists, and said continued axial movement being an axial distance sufficient to cause said portion of said other gripping member to engage the adjacent one of said projections and to move said last-mentioned projection axially a distance substantially equal to said clearance.

6. In a linear motion device, the combination comprising a tubular pressure housing, at least three stop members fixedly disposed in axially spaced relationship within said housing adjacent the inner wall thereof, an elongated linearly movable element disposed in said housing and located inwardly of each of said stop members, said element having a plurality of axially spaced teeth thereon extending outwardly of said element toward said stop members, a first and a second movable support mounted in said housing between a first pair of adjacent ones of said stop members, first means biasing said first and said second supports apart to a position where said first support is axially spaced from said second support, second means biasing said first support to a position spaced from one of said first pair of stop members, a first gripper pivotally mounted on said first and second supports and when said first and second supports are axially spaced, being disposed in an unlatched position in spaced relationship with said teeth of said element, said first gripper being mounted so that when said first and second supports move toward each other, said first gripper is pivotally moved toward said element to a coupled position with a portion of said first gripper being disposed between adjacent teeth of said element, said teeth being formed to provide a clearance between said teeth and said first gripper portion when said first gripper portion is disposed in said coupled position, first solenoid means mounted on said housing at a position adjacent said first and second supports, said first and second supports being formed at least in part from magnetic material so that upon energization of said first solenoid means, said first and second supports move toward each other, second solenoid means mounted on said housing adjacent said one of said first pair of stop members and said first support, said one of said first pair of stop members being formed at least in part from magnetic material so that upon energization of said second solenoid means, said first support and said first gripper moves toward said one of said first pair of stop members, a third and a fourth movable support mounted in said housing between a second pair of adjacent stop members, third means biasing said third support away from one of said second pair of stop members, fourth means biasing said fourth support away from said last-mentioned stop member, a second gripper mounted pivotally on said third and fourth supports, said second gripper normally positioned in said unlatched position with respect to said teeth of said element, third solenoid means mounted on said housing and positioned between said one of said second pair of stop members and said third support, said last-mentioned stop member and said third support being formed at least in part from magnetic material so that upon energization of said third solenoid means, said third support moves toward said last-mentioned stop member, said fourth support being formed to remain stationary during a portion of said last-mentioned movement of said third support, said third support having a portion thereon disposed to engage said fourth support when said portion of said movement of said third support is completed, said third support portion being formed to move said fourth support against the force of said fourth biasing means toward said one of said second pair of stop members during the remainder of the movement of said third support toward said one of said second pair of stop members, said second gripper having a portion thereon shaped so that when said portion is disposed between adjacent teeth of said element a clearance therebetween exists, said second gripper being mounted on said third and fourth supports to move pivotally toward said element during said portion of movement of said third support toward said one of said second pair of stop members with said portion of said second gripper being disposed between adjacent teeth of said element but spaced therefrom a distance substantially equal to said clearance at the completion of said portion of said movement, said second gripper portion being movable axially relative to said element a distance greater than said clearance during said remainder of movement of said second gripper toward said one of said second pair of stop members.

7. In a linear motion device, the combination comprising a linearly movable element having a plurality of axially spaced projections thereon, a pair of gripping members axially spaced relative to said element, mounting means for said gripping members comprising two pairs of independently movable supports, said gripping members being respectively movable to positions between said projections, means pivotally connecting each of said gripping members to one of said pairs of independently movable supports, respectively, means for axially moving one support of one of said pairs of said supports relative to the other support of said one pair to pivotally move its associated gripping member to one of said positions, resilient means engaging said other support for preventing axial movement thereof during only a portion of the axial movement of said one support, and means carried by said one support positioned to engage said other support only when said portion of the axial movement of said one support has been completed, said last-mentioned means moving said other support axially against the force of said resilient means for the remainder of the axial movement of said one support.

8. In a linear motion device, the combination comprising a linearly movable element having a plurality of axially spaced projections thereon, a pair of gripping members axially spaced relative to said element, mounting means for said gripping members comprising two pairs of independently movable supports, said gripping members being respectively movable to positions between said projections, means pivotally connecting each of said gripping members to one of said pairs of independently movable supports, respectively, means for axially moving one support of one of said pairs of said supports relative to the other support of said one pair to pivotally move its associated gripping member to one of said positions, resilient means engaging said other support for preventing axial movement thereof during only a portion of the axial movement of said one support, means carried by said one support positioned to engage said other support only when said portion of the axial movement of said one support has been completed, said last-mentioned means moving said other support axially against the force of said resilient means for the remainder of the axial movement of said one support, said projections being spaced axially an amount sufficient to provide an axial clearance between each gripper and the adjacent ones of said projections when said grippers respectively are located in said positions and the aforesaid remainder of said axial movement of said one support being a distance equal to twice said axial clearance.

9. In a linear motion device, the combination comprising a housing of tubular configuration, a linearly movable element disposed in said housing, a stop member fixedly mounted on the inner wall of said housing in spaced relationship with said linearly movable element, said linearly movable element having a plurality of spaced teeth thereon, a gripper member, a pair of movable support members for said gripper member mounted in said housing adjacent said stop member, motive means for moving one of said support members toward and away from said stop member, means for pivotally mounting said gripper members on said support members, said last-mentioned means being formed to cause pivotal movement of said gripper member into and out of engagement with said teeth upon movement of said one support member relative to the other of said support members, motion resisting means engaging said other support member for preventing the movement of said other support member during a portion of the movement of said one support member, and means carried by said one support member positioned to engage said other support member only when said portion of said movement has been completed, said last-mentioned means moving said other support against the influence of said motion resisting means for the remainder of the movement of said one support means.

10. In a linear motion device, the combination comprising a housing of tubular configuration, a linearly movable element disposed in said housing, a stop member fixedly mounted on the inner wall of said housing in spaced relationship with said linearly movable element, said linearly movable element having a plurality of spaced teeth thereon, a gripper member, a pair of movable support members for said gripper member mounted in said housing adjacent said stop member, motive means for moving one of said support members toward and away from said stop member, means for pivotally mounting said gripper members on said support members, said last-mentioned means being formed to cause pivotal movement of said gripper member into and out of engagement with said teeth upon movement of said one support member relative to the other of said support members, motion resisting means engaging said other support member for preventing the movement of said other support member during a portion of the movement of said one support member, means carried by said one support member positioned to engage said other support member only when said portion of said movement has been completed, said last-mentioned means moving said other support against the influence of said motion resisting means for the remainder of the movement of said one support means, said teeth being spaced an amount sufficient to provide a clearance between said teeth and said gripper member when said portion of said movement has been completed, and the aforesaid remainder of the movement of said one support means being equal to twice said clearance.

11. A linear motion device comprising a linearly movable element, a pair of axially spaced gripper means each having three positions relative to said element comprising unlatched, coupled and latched positions, first solenoid means for causing the first of said gripper means to move to and from said unlatched and said coupled positions, second solenoid means for causing the second of said gripper means to move to and from said unlatched and said coupled positions, third solenoid means for moving said first gripper means axially in one direction to effect incremental movement of said element in said direction when said first gripper means is in the latched position and said second gripper means is in the unlatched position, and load transfer means operable by said second solenoid means for moving said second gripper means from the coupled position to the latched position by axially moving said second gripper means by an amount equal to about twice the axial clearance existing between the movable element and the gripper means in the coupled position.

12. A linear motion device comprising a linearly movable element, a pair of axially spaced gripper means each having three positions relative to said element comprising unlatched, coupled and latched positions, first solenoid means for causing the first of said gripper means to move to and from said unlatched and said coupled positions, second solenoid means for causing the second of said gripper means to move to and from said unlatched and said coupled positions, third solenoid means for moving said first gripper means axially in one direction to effect incremental movement of said element in said direction when said first gripper means is in the latched position and said second gripper means is in the unlatched position, load transfer means operable by said second solenoid means for moving said second gripper means from the coupled position to the latched position by axially moving said second gripper means by an amount equal to about twice the axial clearance existing between the movable element and the gripper means in the coupled position, said second gripper means comprises at least one gripper arm and a first and second support member, said gripper arm being pivotally mounted on said first support member and so connected to said second support member that said gripper arm moves pivotally from the unlatched position to the coupled position when said second support member is actuated by said second solenoid means, mounting means for said first support member causing the latter to remain stationary during movement of said gripper arm from the unlatched position to the coupled position, and said second support member engaging, when said gripper arm reaches the coupled position, said first support member to move it together with said gripper arm axially of said movable element.

13. A linear motion device comprising a linearly movable element, a pair of axially spaced gripper means each having three positions relative to said element comprising unlatched, coupled and latched positions, first solenoid means for causing the first of said gripper means to move to and from said unlatched and said coupled positions, second solenoid means for causing the second of said gripper means to move to and from said unlatched and said coupled positions, third solenoid means for moving said first gripper means axially in one direction to effect incremental movement of said element in said direction when said first gripper means is in the latched position and said second gripper means is in the unlatched position, load transfer means operable by said second solenoid means for moving said second gripper means from the coupled position to the latched position by axially moving said second gripper means by an amount equal to about twice the axial clearance existing between the movable element and the gripper means in the coupled position, said second gripper means comprises at least one gripper arm and a first and second support member, said gripper arm being pivotally mounted on said first support member and so connected to said second support member that said gripper arm moves pivotally from the unlatched position to the coupled position when said second support member is actuated by said second solenoid means, spring means engaging said first support member causing the latter to remain stationary during movement of said gripper arm from the unlatched position to the coupled position, and said second support member engaging, when said gripper arm reaches the coupled position, said first support member to move it together with said gripper arm axially of said movable element.

References Cited in the file of this patent
UNITED STATES PATENTS

| | | |
|---|---|---|
| 1,987,555 | Foster | Jan. 8, 1935 |
| 2,372,853 | Ray | Apr. 3, 1945 |
| 2,752,546 | Frisch | June 26, 1956 |
| 2,831,990 | Young | Apr. 22, 1958 |
| 2,989,871 | Straub et al. | June 27, 1961 |
| 3,050,943 | Thorel et al. | Aug. 28, 1962 |